United States Patent
Kumar et al.

(10) Patent No.: US 11,836,493 B2
(45) Date of Patent: Dec. 5, 2023

(54) MEMORY ACCESS OPERATIONS FOR LARGE GRAPH ANALYTICS

(71) Applicant: INTERNATIONAL BUSINESS MACHINES CORPORATION, Armonk, NY (US)

(72) Inventors: Manoj Kumar, Yorktown Heights, NY (US); Gianfranco Bilardi, Padua (IT); Kattamuri Ekanadham, Mohegan Lake, NY (US); Jose E. Moreira, Irvington, NY (US); Pratap C. Pattnaik, Yorktown Heights, NY (US); Jessica Hui-Chun Tseng, Freemont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3 days.

(21) Appl. No.: 17/650,620

(22) Filed: Feb. 10, 2022

(65) Prior Publication Data
US 2023/0251862 A1    Aug. 10, 2023

(51) Int. Cl.
*G06F 9/30*       (2018.01)
*G06F 9/38*       (2018.01)
*G06F 12/0815*    (2016.01)

(52) U.S. Cl.
CPC ...... *G06F 9/30043* (2013.01); *G06F 9/30087* (2013.01); *G06F 9/3834* (2013.01); *G06F 12/0815* (2013.01)

(58) Field of Classification Search
CPC .............. G06F 9/30043; G06F 9/3004; G06F 9/30047; G06F 9/30087; G06F 9/3834; G06F 12/0815; G06N 20/00
See application file for complete search history.

(56) References Cited

U.S. PATENT DOCUMENTS

| | | | |
|---|---|---|---|
| 8,561,043 B2 | 10/2013 | Ayguade et al. | |
| 8,561,044 B2 | 10/2013 | Chen et al. | |
| 8,776,034 B2 | 7/2014 | Chen et al. | |
| 2017/0083340 A1* | 3/2017 | Burger | G06F 9/32 |
| 2017/0293486 A1* | 10/2017 | Rozario | G06F 12/0897 |
| 2017/0371659 A1* | 12/2017 | Smith | G06F 9/3857 |
| 2017/0371660 A1* | 12/2017 | Smith | G06F 9/30043 |

* cited by examiner

*Primary Examiner* — Eric Coleman
(74) *Attorney, Agent, or Firm* — Griffiths & Seaton PLLC

(57) ABSTRACT

Embodiments for providing memory access operations for graph analytics by a processor are disclosed. An entire chunk of load and store instructions may be atomically and concurrently executed, where the entire chunk of the load and store instructions are delineated from a plurality of alternative load and store instructions.

18 Claims, 7 Drawing Sheets

MEMORY ACCESS OPERATIONS FOR LARGE GRAPH ANALYTICS

BACKGROUND

The present invention relates in general to computing systems, and more particularly, to various embodiments for providing memory access operations for large graph analytics in a computing environment using a computing processor.

SUMMARY

According to an embodiment of the present invention, a method for providing memory access operations for graph analytics in a computing environment, by one or more processors, is depicted. An entire chunk of load and store instructions may be atomically and concurrently executed, where the entire chunk of the load and store instructions are delineated from a plurality of alternative load and store instructions using additional instructions defined for the delineation.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE INVENTION

Figure 1:
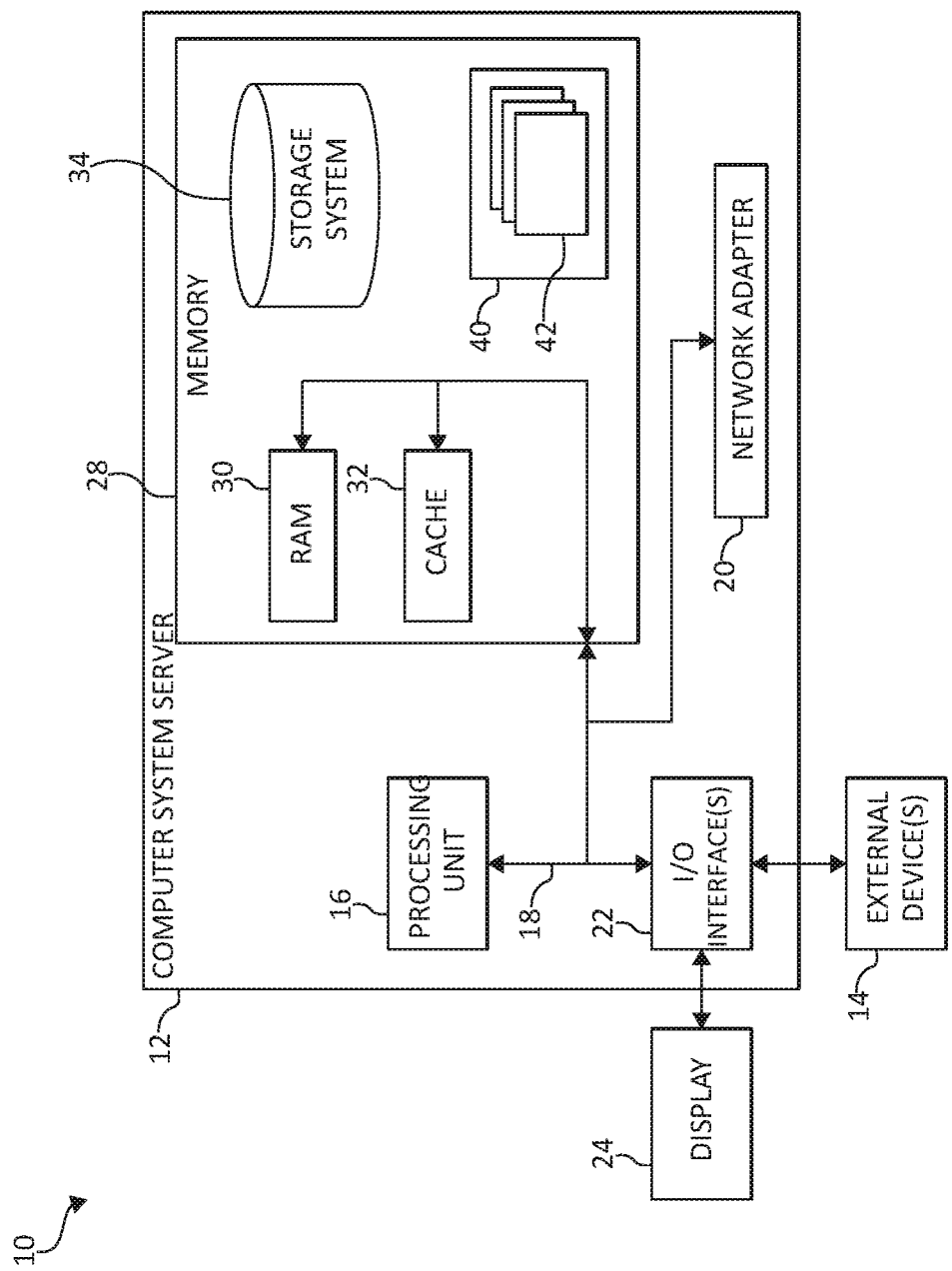
FIG. 1 is a block diagram depicting an exemplary cloud computing node according to an embodiment of the present invention.

The present invention relates generally to the field of data storage, and more specifically, to methods, systems, and computer usable program products for reducing memory access latency such as, for example, providing enhanced memory access operations for large graph analytics in a computing environment and the like. However, it is to be understood that embodiments of the invention are not limited to the illustrative methods, systems and devices but instead are more broadly applicable to other suitable methods, systems, and computer usable program product.

Moreover, unstructured data such as large-scale graph data is generally problematic for conventional memory access. Large scale graph analytics have been drawing increasing attention in both academia and industry. Researchers have found high impact applications in a wide variety of big data domains, ranging from social media analysis, recommendation systems, and insider threat detection, to medical diagnosis and protein interactions. These applications typically handle a vast collection of entities with various relationships, which are represented by graphs. Due to irregular data access patterns in the graph computations, it remains a challenge to deliver efficient solutions for large scale graph analytics. Such inefficiency restricts the utilization of many graph algorithms in big data scenarios.

Additionally, the connectivity of large-scale graph is highly irregular with very poor locality of access, i.e., accesses to large subsets of graph nodes or edges induce memory access patterns with very poor spatial or temporal locality in memory addresses. These memory access patterns generally cannot be performed efficiently in modern processor architectures. The consequence of these irregular accesses to memory is excessive cache misses and address translation misses that result in poor performance of the computing system.

Furthermore, out-of-order processors are unable to mask these latencies as the instruction completion table ("ICT") and the various hardware queues used to support in flight load/store instruction fail to have sufficient entries (e.g., load miss queue ("LMQ"), load reorder queue ("LRQ"), store reorder queue ("SRQ"), etc.).

Accordingly, various embodiments are provided for providing memory access operations for graph analytics in a computing environment, is depicted. That is, the present invention provides for processing large sequences of poor-locality load and store ("load/store") instructions in a specialized and unique hardware unit of the processor, to sequence, dispatch, and complete the load and store ("load/store") instructions.

In some implementations, an entire chunk (or set) of load and store instructions may be atomically and concurrently executed (using a special instruction), where the entire chunk of the load and store instructions are delineated from a plurality of alternative load and store instructions.

It should be noted that as used herein, "chunk code" may be defined as a sequence load operations, paired with matching store operation, storing the value loaded and atomically executed. The chunk code can be viewed as a sequence of memory-to-memory operations. A large number of load-store operations pairs in a chunk code may be atomically and concurrently executed (e.g., approximately 256 or 1024 load/store instruction pairs). A chunk code may be the equivalent of a vector load followed by a vector store instruction implemented in an application/software (e.g., the chuck code may also be referred to as "virtual instructions"), either of both fetching data from or storing data into non-sequential memory locations, i.e., performing gather and scatter ("gather/scatter") operations. All load instructions can be executed in any arbitrary order, but the execution of store instructions may have the following constraints such as, for example, respecting all load/stored dependencies and all store instructions must be to distinct locations.

Also, a chunk completion table ("CCT") may be used for supporting hardware for executing chunk code. As used herein, "additional hardware" may refer to a separate low-energy (e.g., low cost) instruction completion table in a processor front-end for the chunk code execution where the table is referred to as the "chunk completion table ("CCT").

Also, "three special instructions" may be used to interface chunk code to a main program. The three special instructions are 1) "chunk_init", 2) "chunk_start", and 3) "when_chunk_complete".

All load/store instructions between the chunk_init and chunk_start special instructions are executed using the CCT rather than an instruction completion table ("ICT") (traditional Instruction Completion table), and no other code instructions can be executing concurrently to the chunk code. The chunk_init instruction initializes the CCT and signals to the chunk front-end that all load and store instructions following it and until chunk_start will be handled by the CCT, the special instruction sequencing, dispatch, completion unit.

Also, as used herein, a "chunk_complete_flag" operation may be used and is shared between chunk front-end and a main core, which may be used to synchronize resumption of the main thread after completion of all chunk load/stores. The chunk_start and when_chunk_complete instructions are executed in the front-end to withhold execution of subsequent instructions until all chunk instructions have completed.

The chunk code instructions may be executed from the CCT. In some implementations, for programming, an application programmer and/or machine learning operation may be responsible for ensuring that there are no dependencies between the chunk code and a remining code preceding chunk_start and following when_chunk_complete instructions. The chunk code may include a variant of the load/store instructions handled by the CCT. The load/store instructions in the chunk code do not have an entry in the ICT. That is, the CCT is the alternative to ICT, created to handle the load/store instructions of the chunk code. The CCT is specialized for the chunk-code semantics. So, the chunk code instructions are put only in CCT and not in the ICT.

In some implementations, for execution of the chunk code, a sequence of LOAD/STORE instructions, beginning with "chunk_init" and until "chunk_start", may be sent to chunk completion table CCT. Since the "chunk_start" and "when_chunk_complete" instructions are synchronization points: 1) there are no dependencies between the instructions of the chunk and non-chunk instructions; 2) there are no dependencies between the LOAD instructions of the chunk, and each STORE instruction is dependent only on one matching LOAD instruction in the chunk; 3) dependent LOAD/STORE instruction pairs in the chunk can complete in any order and only completion of all instructions of the chunk needs to be tracked.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
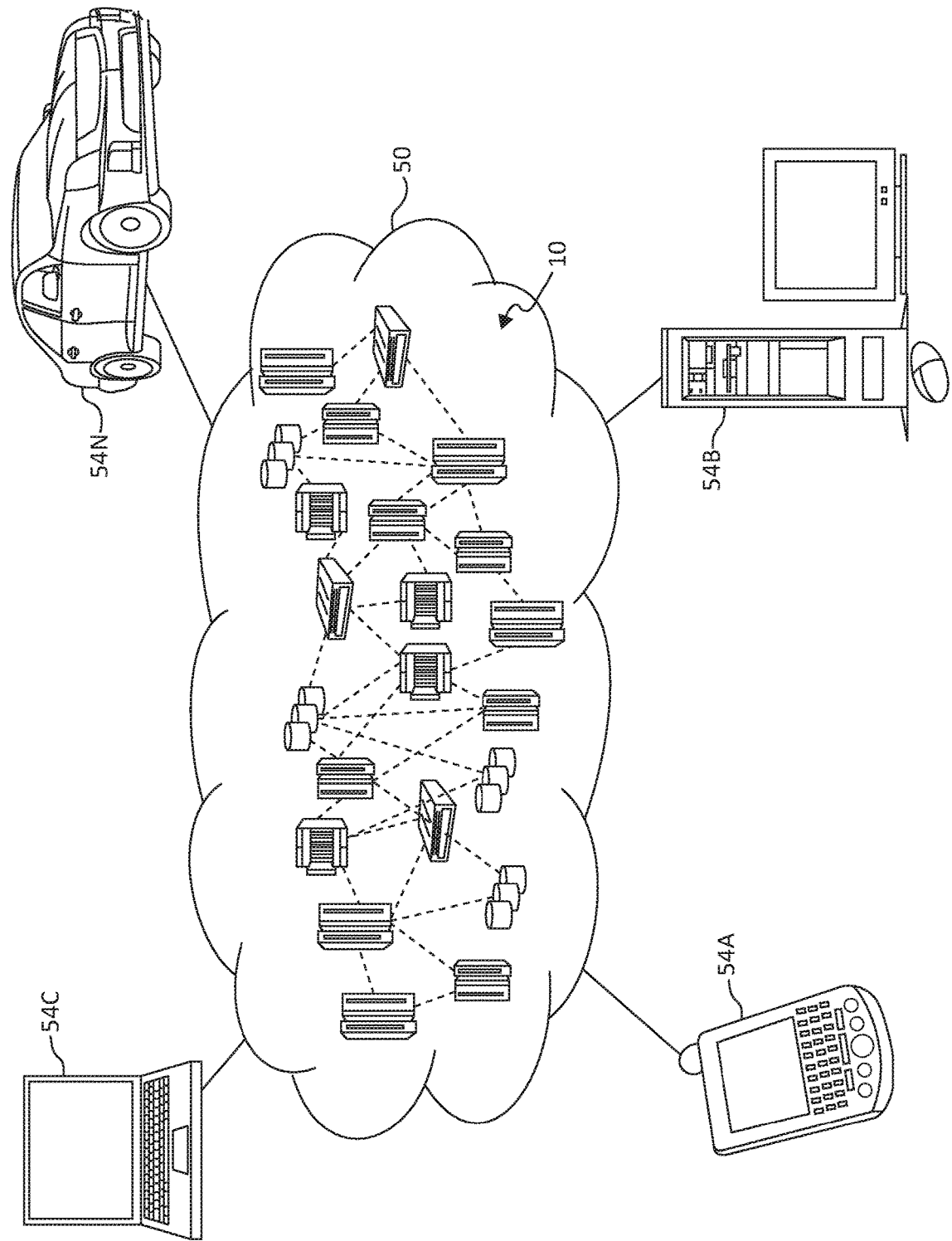
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
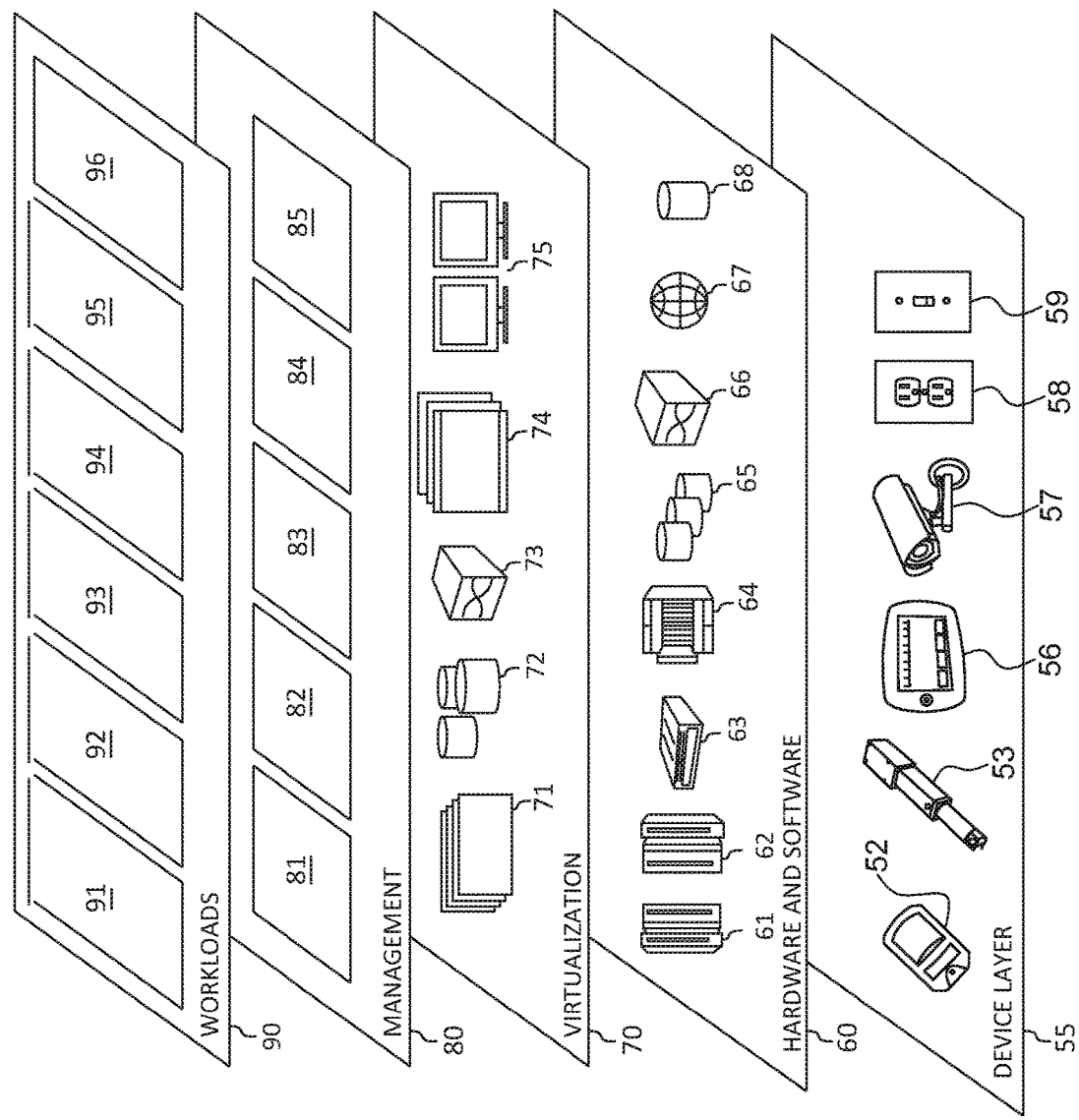
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing memory access operations for large graph analytics in a computing environment (e.g., in a neural network architecture). In addition, workloads and functions 96 for providing memory access operations for large graph analytics in a computing environment may include such operations as analytics, deep learning, and as will be further described, user and device management functions. One of ordinary skill in the art will appreciate that the workloads and functions 96 for providing memory access operations for large graph analytics in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing memory access operations for large graph analytics in a computing environment by one or more processors in a computing system. An entire chunk of load and store instructions may be atomically and concurrently executed, where the entire chunk of the load and store instructions are delineated from a plurality of alternative load and store instructions.

In some implementations, a pair of instructions (e.g., a pair of instructions, for example, chunk-init and chunk-start) may be used to delineate a sequence of load/store operations that are executed atomically and in arbitrary order. A split instruction completion table (e.g., chunk completion table ("CCT") in conjunction with an instruction completion table (ICT)) may be used where one of the tables is dedicated and implemented optimally for a delineated set load/store operations that have poor locality of reference. Third, any TLB misses, or page faults may be batched and combined across all load/store instructions of the delineated code (e.g., load/store operations). Fourth, cache performance may be optimized by bypassing the cache for the delineated load/store operations. Fifth, memory subsystems (e.g., memory bus) performance may also be optimized by transferring smaller blocks of data for the delineated load/store operations.

For example, for optimizing cache and the memory subsystems for poor reference locality chunk code, programming for delineating memory operations that have poor locality of reference can be exploited in cache replacement policies for level 1 ("L1"), level 2 ("L2") cache, . . . , LLC cache. In one aspect, the data being accessed through CCT is not cached, hence there is need to evict lines from the cache that are likely to have higher locality of reference for the instructions executing out of the instruction completion table ("ICT"). Also, the size of data transfer on a memory bus can be optimized. For example, for a request from the CCT, instead of fetching the entire 64-byte cache line or 128-byte cache line, only the data bytes specified by the memory operation are transferred. If the data is being cached, the remaining bytes may be marked as invalid.

Figure 4:
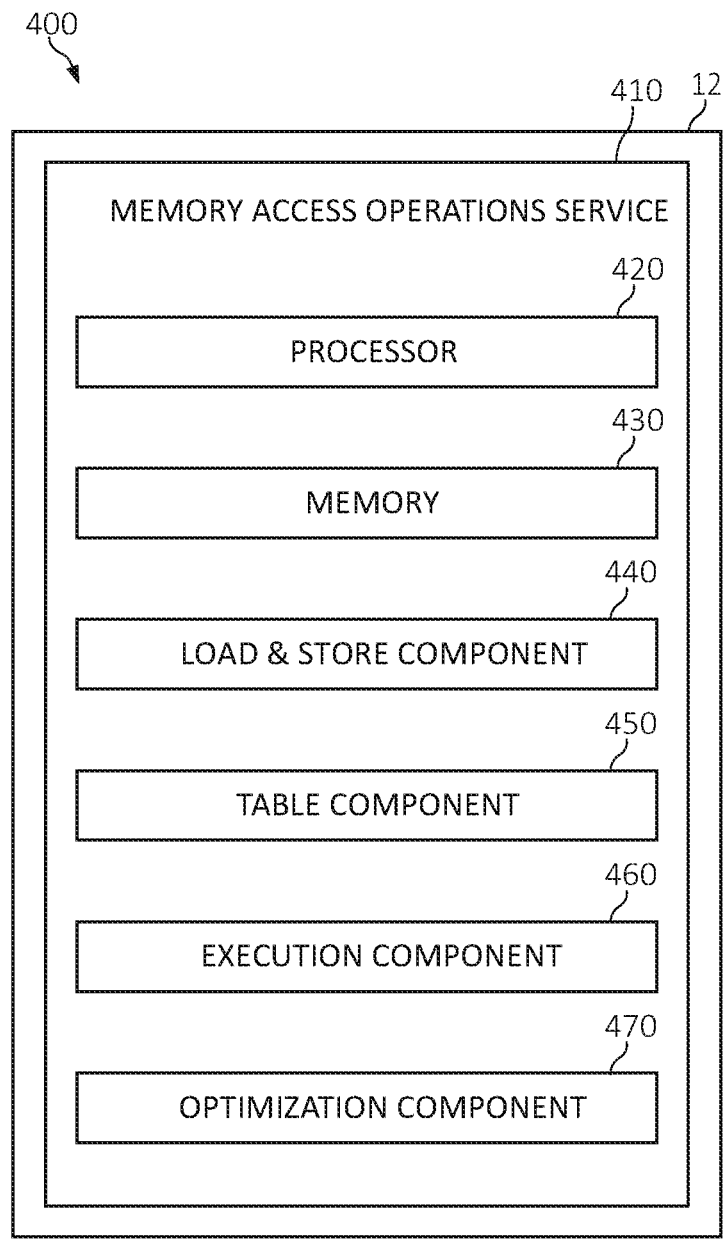
FIG. 4 is an additional block diagram depicting an exemplary functional relationship between various aspects of the present invention.

Turning now to FIG. 4, a block diagram depicting exemplary functional components of system 400 for implementing and providing memory access operations for large graph analytics in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

As one of ordinary skill in the art will appreciate, the depiction of the various functional units in the system 400 is for purposes of illustration, as the functional units may be located within or external to the computer system/server 12 of FIG. 1 or elsewhere within and/or between distributed computing components.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

Memory access operations services 410 is shown, incorporating processing unit 420 ("processor") to perform various computational, data processing and other functionality in accordance with various aspects of the present invention. In one aspect, the processor 420 and memory 430 may be internal and/or external to the memory access operations services 410, and internal and/or external to the computing system/server 12. The memory access operations services 410 may be included and/or external to the computer system/server 12, as described in FIG. 1. The processing unit 420 may be in communication with the memory 430. The memory access operations services 410 may include a load and store component 440, a table component 450, an execution component 460, and an optimization component 470, and an optimization component 470.

In some implementations, the memory access operations services 410 may, using the load and store component 440, the table component 450, the execution solution component 460, and the optimization component 470 atomically and concurrently execute an entire chunk of load and store instructions, where the entire chunk of the load and store instructions are delineated from a plurality of alternative load and store instructions.

In other implementations, the memory access operations services 410 may, using the load and store component 440, the table component 450, the execution solution component 460, and the optimization component 470, use a one or more specialized instructions to delineate a sequence of load and store instructions.

In other implementations, the memory access operations services 410 may, using the load and store component 440, the table component 450, the execution solution component 460, and the optimization component 470, represent the entire chunk of the load and store instructions as a single instruction.

In other implementations, the memory access operations services 410 may, using the load and store component 440, the table component 450, the execution solution component 460, and the optimization component 470, synchronize a primary thread with a completion of the entire chunk of the load and store instructions, wherein the entire chunk of the load and store instructions is represented as a single instruction.

In some implementations, the memory access operations services 410 may, using the load and store component 440, the table component 450, the execution solution component 460, and the optimization component 470, batch process one or more translation lookaside buffer ("TLB") misses or page faults in the entire chunk of the load and store instructions.

In some implementations, the memory access operations services 410 may, using the load and store component 440, the table component 450, the execution solution component 460, and the optimization component 470, bypass a cache for the entire chunk of the load and store instructions.

In other implementations, the memory access operations services 410 may, using the load and store component 440, the table component 450, the execution solution component 460, and the optimization component 470, transfer data blocks of a reduced size for the entire chunk of the load and store instructions.

Thus, the memory access operations services 410 may atomically and concurrently execute an entire chunk or set of load and store instruction pairs. The memory access operations services 410 may use one or more special instructions to delineate the load and store instruction pairs of the chunk from other load and store instructions. The memory access operations services 410 may represent all load and store instructions of the chunk as a single instruction in a main thread to 1) synchronize execution of the main thread with the completion of all instructions in the chunk, and 2) handle/process the translation lookaside buffer ("TLB")/data cache effective to real address translation ("DERAT") (e.g., "TLB/DERAT") misses and page faults in batch.

Figure 5:
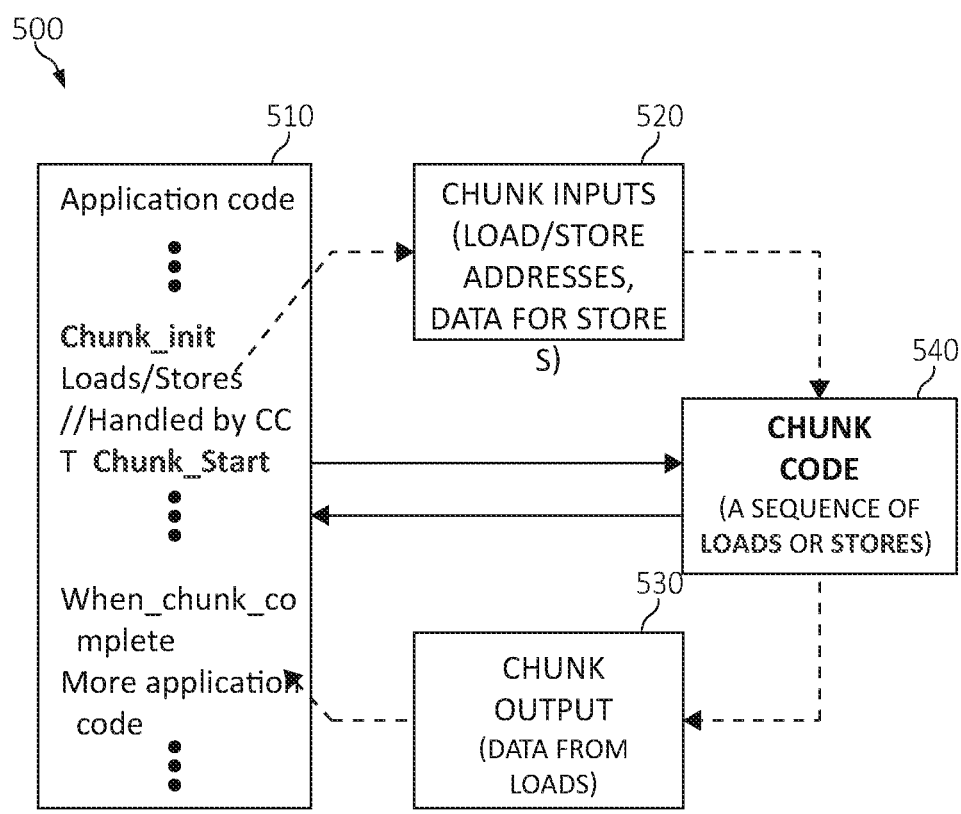
FIG. 5 depicts block flow diagram depicting operations for providing memory access operations for large graph analytics in a computing environment according to an embodiment of the present invention.

For further explanation, FIG. 5 is an additional block diagram depicting operations of providing memory access operations for large graph analytics in which aspects of the present invention may be realized. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity.

As depicted, application code 510 may, in order to interface chunk code to a main program, use the three special instructions; 1) "chunk_init", 2) "chunk_start", and 3) "when_chunk_complete".

In one aspect, the instruction of "chunk_init" instruction 520 may be used to start a set-up operation of a load and store instructions (e.g., a vector-load instruction and vector store instruction) manifested in the chunk code 540 in the chunk completion table ("CCT") such as, for example, a 256-element (or 1024-element) indexed vector load and store instructions. That is, a chunk may be defined as a collection of load-store instruction pairs. In one aspect, only the load instructions of all such pairs are 'si a vector load. Similarly all the store instructions of the pairs are like vector store.

As previously stated, all load/store instructions between the chunk_init instruction and the chunk_start special instruction are executed by the CCT rather than an instruction completion table ("ICT") (traditional Instruction Completion table), and no other code instructions can be executing concurrently to the chunk code. The chunk_init instruction 520 initializes the CCT and signals to the processor front-end that all load and store instructions following it and until chunk_start instruction will be handled by the CCT, the special instruction sequencing, dispatch, completion unit.

The chunk_start instruction launches the vector-load and vector store instructions set up by chunk_init instruction. A number of load (or store instructions) instructions in the chunk may be atomically and asynchronously completed. The chunk_start instruction ensures completions of all instructions prior to the chunk_start instruction.

The when_chunk_complete is also a synchronization point and ensures completion of chunk code and availability of the chunk output 530 (the result of chunk loads-store instruction being available in the memory locations of the stores) before subsequent instructions are dispatched, Again, for execution of the chunk code 540, a sequence of load and instructions, beginning with "chunk_init" and until "chunk_start", may be sent to chunk completion table CCT. Since the "chunk_start" and "when_chunk_complete" instructions are synchronization points: 1) there are no dependencies between the instructions of the chunk and non-chunk instructions; 2) there are no dependencies between the load instructions of the chunk, and each store instruction is dependent only on its paired matching load instruction in the chunk; 3) dependent load and store instruction pairs in the chunk code 540 can complete in any order and only completion of all instructions of the chunk needs to be tracked. The chunk output 530 (e.g., data from loads) may be provided back to the application code 510 for completion.

Figure 6:
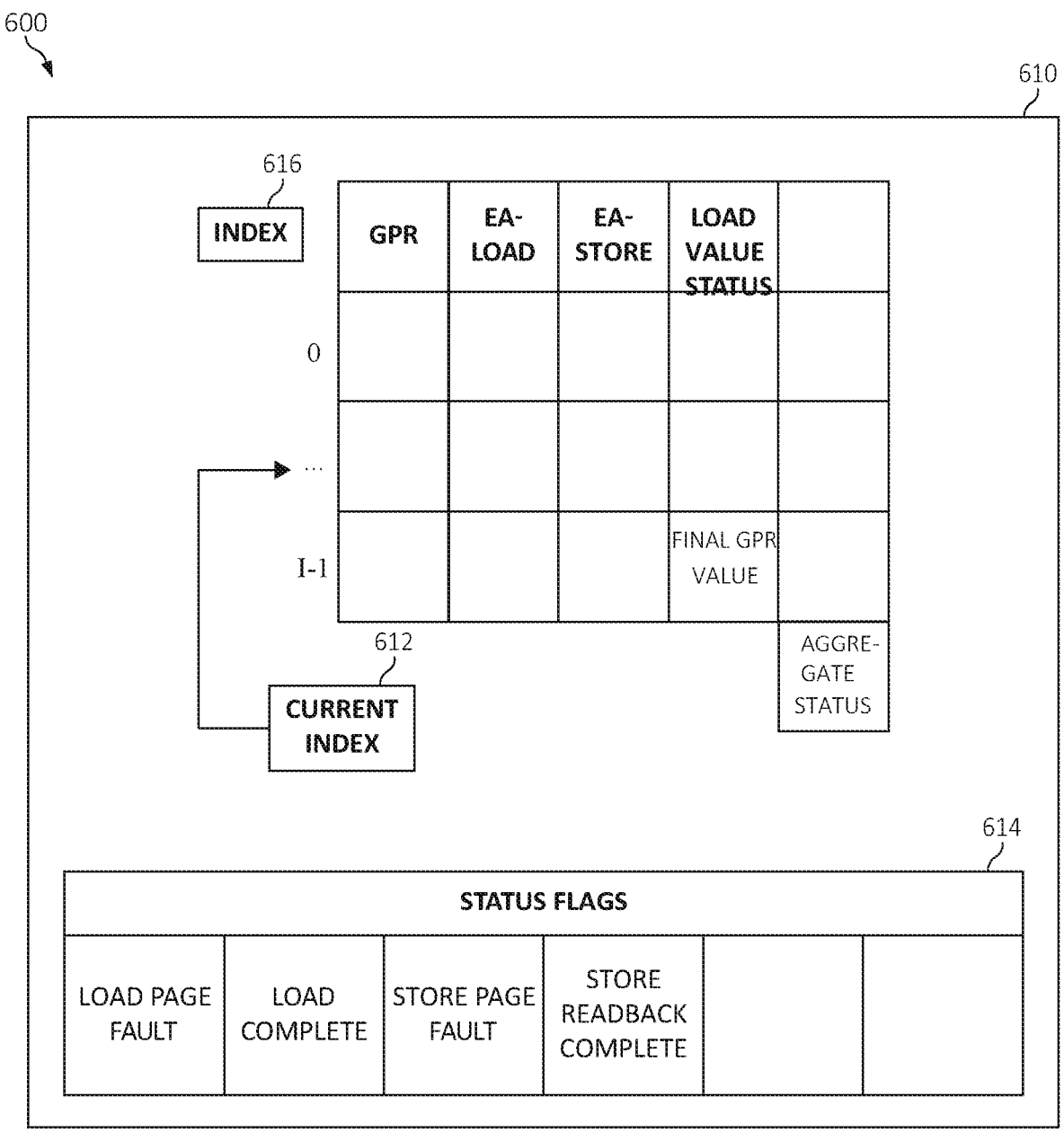
FIG. 6 depicts block diagram depicting operations using a chunk completion table (CCT) for providing memory access operations for large graph analytics in a computing environment according to an embodiment of the present invention.

For further explanation, FIG. 6 depicts block diagram 600 depicting operations using a chunk completion table (CCT) for providing memory access operations for large graph analytics. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity.

As depicted, a chunk completion table (CCT) 610 is depicted having a general-purpose register file ("GPR"), entries for load and store instructions (e.g., virtual address or effective address "EA"-load, EA-store), a load value, and a status along with an index 616 and a current index 612. The CCT 610 may also include status flags 614 that may include one or more status flags such as, for example, a load page fault, a load complete, a store page fault, and a store readback complete. Also, the CCT 610 subsumes and functions as the load/store instruction queue.

In general, a sequence of load store instructions may be formed as a chunk (using special instructions as boundary markers), with index 616 indicating the number of valid load-store instruction pairs in the CCT 610 and equivalently the number of such load-store pairs in the chunk. The current index 612 is a counter to sequence through the entries of the chunk. The chunk may be represented as a single instruction in a primary/main thread.

For each chunk of load and store instructions, there are no output dependence across stores, and paired load store instructions with true dependence are restricted to that particular pair of load store instructions. At decode, these chunks of load and store instructions may be queued in the CCT 610 and the CCT is capable of holding the results of all loads. After enqueue, all instructions in the CCT 610 may be executed concurrently and asynchronously. The CCT 610 may also detect the completion of the entire chunk.

Thus, the CCT 610 tracks all load and store instructions in a chunk, which may be, for simplicity of exposition, considered as a sequence of up to I load and store instruction pairs, originally serialized by the same GPR. In one aspect, a chunk executes atomically and begins with the "chunk_start" instruction.

Since multiple page-faults or translation lookaside buffer ("TLB") misses can be generated by the sequence of load and store instructions, the page-fault handling is batched with the ability to issue, finish, and retire one or more load or store instructions concurrently, and the execution latency of a chunk is equal to, or a small multiple of, the execution latency of a single load and store pair.

The CCT 610 may be cleared by a chunk_init instruction. The execution of the load and store instructions in the CCT 610 commences with the chunk_start instruction, and the CCT 610 generates a chunk_complete_flag instruction upon completion of all the instructions in the chunk. The chunk_complete_flag instruction operation may be used and is shared between chunk front-end and a main processor core, which may be used to synchronize resumption of the main thread after completion of all chunk load/stores. The chunk_complete_flag is set when all stores complete and it is a signal to retire the when_chunk_complete instruction.

The CCT 610 may also provide a single GPR that may be interpreted as a target of all load instructions and the load instruction's final value will be placed in the GPR. Again, the CCT 610 represents load and store queues of a conventional processor having the load and store addresses and storage locations to hold the load values. The storage locations may be renamed GPRs (e.g., a set of registers sharing the same name, label, or address) but dedicated to use by the CCT 610.

It should be noted that the present invention also provides for enabling and processing store-hit-stores in a chunk code. That is, if two store instructions are allowed to modify the same memory location; the two store instructions need to be executed in correct order. Thus, the present invention provides for two-solution approaches. First, one or more bloom filters may be used to identify the earliest (oldest) store instruction to a location. Extra fields may be used in the CC 610. A store_blocked instruction may be used to block stores that are colliding with an earlier store.

Second, one or more hash tables may be used to guarantee that only the youngest store to the same location is executed and while the remaining stores may be discarded. This approach is operationally more efficient as it eliminates dead code (stores) at run time based on address values. When a younger store is found, the older store is marked complete to the same location.

In some implementations, for execution of the chunk_code instructions with bloom filters, the store_blocked field instruction in the CCT 610 is used to block all younger stores in the chunk writing to the same location as some older store. As a result, some stores may not be executed preventing the chunk_complete_flag from being set, forcing another iteration of the outer while loop to complete the blocked stores.

Figure 7:
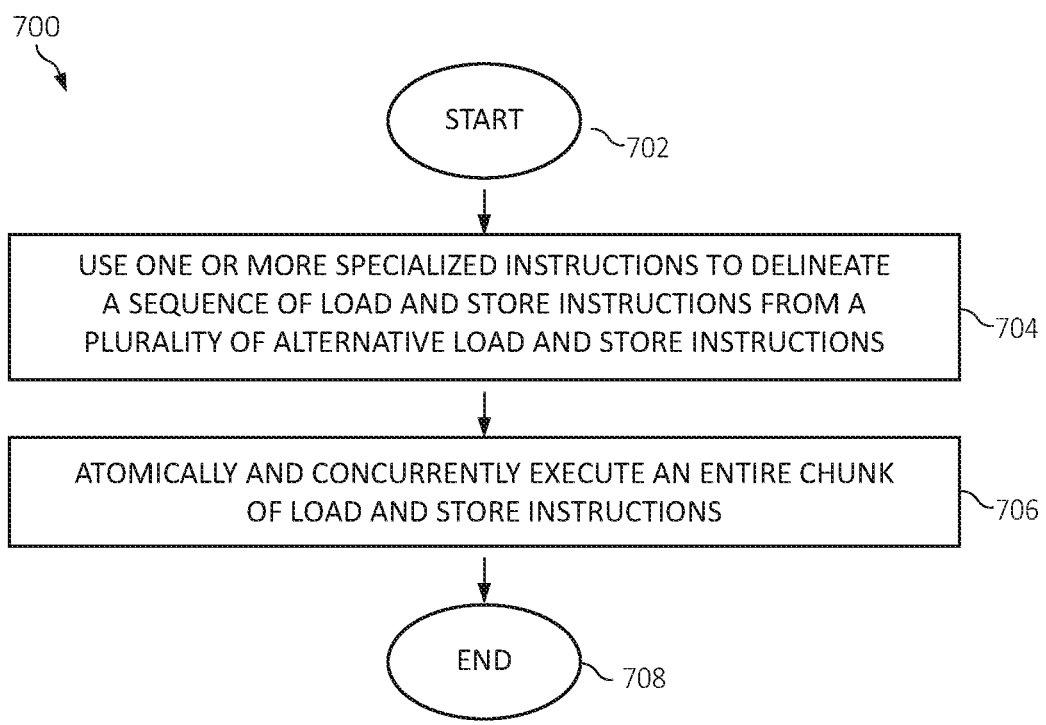
FIG. 7 is a flowchart diagram depicting an exemplary method for providing memory access operations for large graph analytics in a computing environment, by a processor, in which aspects of the present invention may be realized.

Turning now to FIG. 7, a method 700 for providing memory access operations for graph analytics in a computing environment using a processor is depicted, in which various aspects of the illustrated embodiments may be implemented. The functionality 700 may be implemented as a method (e.g., a computer-implemented method) executed as instructions on a machine, where the instructions are included on at least one computer readable medium or one non-transitory machine-readable storage medium. The functionality 700 may start in block 502.

One or more specialized instructions may be used to delineate a sequence of load and store instructions from a plurality of alternative load and store instructions, as in block 504. An entire chunk of load and store instructions that are delineated may be atomically and concurrently executed, as in block 706. The functionality 700 may end, as in block 708.

In one aspect, in conjunction with and/or as part of at least one blocks of FIG. 7, the operations of method 700 may include each of the following. The operations of 700 may use a one or more specialized instructions to delineate a sequence of load and store instructions. The operations of 700 may represent the entire chunk of the load and store instructions as a single instruction.

The operations of 700 may synchronize a primary thread with a completion of the entire chunk of the load and store instructions, wherein the entire chunk of the load and store instructions is represented as a single instruction. The operations of 700 may batch processing one or more translation lookaside buffer ("TLB") misses or page faults in the entire chunk of the load and store instructions. The operations of 700 may bypass a cache for the entire chunk of the load and store instructions. The operations of 700 may transfer data blocks of a reduced size for the entire chunk of the load and store instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing memory access operations for graph analytics in a computing environment by one or more processors comprising:
    atomically and concurrently executing an entire chunk of load and store instructions, wherein the entire chunk of the load and store instructions are executed according to a plurality of specialized instructions utilized only to interface the load and store instructions between a distinct chunk completion table and a program.

2. The method of claim 1, further including using the chunk completion table to define a sequence of the load and store instructions.

3. The method of claim 1, further including synchronizing a primary thread with a completion of the entire chunk of the load and store instructions.

4. The method of claim 1, further including batch processing translation lookaside buffer ("TLB") misses or page faults in the entire chunk of the load and store instructions.

5. The method of claim 1, further including bypassing a cache for the entire chunk of the load and store instructions.

6. The method of claim 1, further including transferring only data bytes within a cache line specified by the load and store instructions.

7. A system for providing memory access operations for graph analytics in a computing environment, comprising:
    one or more computers with executable instructions that when executed cause the system to:
        atomically and concurrently execute an entire chunk of load and store instructions, wherein the entire chunk of the load and store instructions are executed according to a plurality of specialized instructions utilized only to interface the load and store instructions between a distinct chunk completion table and a program.

8. The system of claim 7, wherein the executable instructions when executed cause the system to use the chunk completion table to define a sequence of the load and store instructions.

9. The system of claim 7, wherein the executable instructions when executed cause the system to synchronize a primary thread with a completion of the entire chunk of the load and store instructions.

10. The system of claim 7, wherein the executable instructions when executed cause the system to batch process translation lookaside buffer ("TLB") misses or page faults in the entire chunk of the load and store instructions.

11. The system of claim 7, wherein the executable instructions when executed cause the system to bypass a cache for the entire chunk of the load and store instructions.

12. The system of claim 7, wherein the executable instructions when executed cause the system to transfer only data bytes within a cache line specified by the load and store instructions.

13. A computer program product for providing memory access operations for graph analytics in a computing environment, the computer program product comprising:
    one or more computer readable storage media, and program instructions collectively stored on the one or more computer readable storage media, the program instruction comprising:
        program instructions to atomically and concurrently execute an entire chunk of load and store instructions, wherein the entire chunk of the load and store instructions are executed according to a plurality of specialized instructions utilized only to interface the load and store instructions between a distinct chunk completion table and a program.

14. The computer program product of claim 13, further including program instructions to use the chunk completion table to define a sequence of the load and store instructions.

15. The computer program product of claim 13, further including program instructions to
    synchronize a primary thread with a completion of the entire chunk of the load and store instructions.

16. The computer program product of claim 13, further including program instructions to batch process translation lookaside buffer ("TLB") misses or page faults in the entire chunk of the load and store instructions.

17. The computer program product of claim 13, further including program instructions to bypass a cache for the entire chunk of the load and store instructions.

18. The computer program product of claim 13, further including program instructions to transfer only data bytes within a cache line specified by the load and store instructions.

* * * * *